2,945,068
PYROLYSIS OF LIMONENE OXIDE

Albert B. Booth, Houston, Tex., assignor to The Glidden Company, Cleveland, Ohio, a corporation of Ohio No Drawing. Filed Dec. 31, 1957, Ser. No. 706,292

3 Claims. (Cl. 260—587)

This invention relates to a process for preparing terpene compounds containing an oxygen atom on the No. 2 carbon of the p-menthane skeleton. The invention is more specifically directed to a process for preparing oxygenated terpene compounds wherein the oxygen is present on the No. 2 carbon of the p-menthane skeleton by employing as its starting material an epoxide, that is, limonene oxide, as will be more fully disclosed hereinafter.

It is known that the terpenic compounds, carvone, carveol, carvyl esters, dihydrocarvone and dihydrocarvyl esters, and the like, are valuable ingredients of essential oils and are prized individually and/or in combination as flavors, perfume ingredients, constituents of various pharmaceutical preparations, etc. Thus, among the most valuable of the terpenics found in essential oils are those responsible for the flavors of spearmint, caraway and dill. These terpenes are characterized by the presence of an oxygen atom on the No. 2 carbon of the p-menthane skeleton.

The most valuable of the above mentioned oxygenated compounds from the standpoint of its relative abundance or proportion in the above essential oils is carvone. Many of these terpenic compounds are produced normally only as a result of highly skilled agricultural practices and many of them must be imported. My invention, therefore, contributes substantially toward the desirable goal of providing essential oil ingredients from available and cheap domestic raw materials.

In view of the foregoing, my invention has as its objects the following: To provide a novel process for preparing oxygenated terpene compounds wherein the oxygen atom is on the No. 2 carbon atom of the p-menthane skeleton; to provide an improved process for treating limonene-1,2-oxide thereby converting it to desired essential oil ingredient constituents; to provide a new process for the production of carveol, carvone, dihydrocarvone, and the like; to produce carvone precursors readily convertible to carvone from limonene-1,2-oxide; to produce oxygenated terpenes having the p-menthane skeleton which possess spearmint, caraway or dill flavors. Other objects will be appreciated from a reading of the description of my invention.

The foregoing objects can be attained, as I have discovered, by a process which comprises pyrolyzing limonene-1,2-oxide.

The starting material, limonene oxide, can be obtained by oxidation of citrus limonene which is an inexpensive by-product of the citrus industry. Thus, the terpene, limonene, can be oxidized either by treating it with peracetic acid, perbenzoic acid, etc., or by air blowing, all as known heretofore. The epoxide can also be prepared by a process disclosed in copending application Serial No. 377,000, filed August 27, 1953. In that copending invention there is disclosed an improved process for obtaining limonene-1,2-epoxide by treating an air oxidation mixture of limonene with a reducing agent under nonacidic conditions. Any known means for preparing the starting limonene epoxide can be employed. By the terms "limonene oxide" or "limonene epoxide" as used throughout this specification, I mean limonene-1,2-epoxide (limonene-1,2-monoxide), which also may be called more systematically 1,2-epoxy-8-p-menthene.

Limonene-1,2-monoxide (1,2-epoxy-8-p-menthene) is capable of existing in two forms which have hitherto not been distinguished, viz: 1,2-epoxy cis-8-p-menthene and 1,2-epoxy trans-8-p-menthene. The cis and trans refer to the relation between the methyl and isopropenyl groups of the 8-p-menthene skeleton. It is believed that the low boiling form is the cis form and the high boiling form is the trans form. It has been found in this laboratory that when prepared from d-limonene (citrus limonene) their properties are as follows:

|  | Low Boiling Form | High Boiling Form |
|---|---|---|
| B.P. at 10 mm._____° C__ | 75 | 77 |
| $[\alpha]_D$_____degrees__ | 41.7 | 80.5 |
| $N_D^{25}$_____ | 1.4642 | 1.4642 |
| $d_4^{25}$_____ | 0.925 | 0.925 |

When the limonene-1,2-monoxide is produced by air oxidation of limonene, it is mostly, say 75%, the low boiling form and when prepared by epoxidation of limonene with buffered peracetic acid, it consists of about equal proportions of the cis- and trans-forms. The two forms are quite difficult to separate cleanly from each other in consequence of their close boiling points and therefore I ordinarily prefer to employ the mixed cis-trans forms. I find that the low boiling form is more easily pyrolyzed than is the higher boiling form and therefore any unpyrolyzed epoxide recovered from pyrolysis mixtures will be richer in the high boiling form and will require somewhat higher pyrolysis temperatures to convert at the same rate as the lower boiling form or will require longer time at the same temperature to achieve equal conversion.

Furthermore, I find that while both forms on pyrolysis yield carvone and dihydrocarvone that the low boiling form yields also trans-carveol and a pseudocarveol whereas the higher boiling form of the epoxide yields cis-carveol and a pseudocarveol which is a different isomer than the one produced from the lower boiling epoxide. By pseudocarveol I mean 1(7),8-p-menthadiene-2-ol, psi limonene-2-ol.

A general embodiment of my invention comprises heating limonene oxide at temperatures from about 200° C. to about 550° C. to produce a thermal rearrangement of the molecule to produce carveol, carvone, dihydrocarvone and pseudocarveol and to recover the products produced. It will be appreciated by those skilled in the art that pyrolysis at the lower temperatures may be conveniently accomplished by heating a batch of the epoxide for a period of hours whereas use of higher temperatures requires the much shorter heating times (in the order of a fraction of a minute or a fraction of a second) which are most conveniently provided by operating continuously. Continuous operation may be used for either liquid or vapor phase pyrolysis, but at temperatures of, say, 400° C. or above I prefer to employ vapor phase pyrolysis, suitably at atmospheric pressure. Since the products of pyrolysis tend to polymerize on continued heating, I usually prefer to pyrolyze under mildest conditions where only say 50–90% of epoxide is reacted and then recover unchanged product for recycle to the process.

The methods chosen for working up the pyrolysate can vary according to the product or products desired. Usually at least a rough distillation is employed to recover unchanged epoxide for recycle and to provide other fractions rich in one product or the other. Thus, unreacted oxide and dihydrocarvone can be obtained pure by distillation alone. Since, however, the carveols, carvone and pseudocarveols in admixture are not ordinarily sharply separable by distillation it will be found convenient to separate such mixtures by chemical means. Thus the carvone can be removed from the alcohols by extraction with ketone reagents such as aqueous sulfites or the alcohols can be separated by converting them to high boiling esters, such as borates or acetoacetates which are readily freed of the unreacted ketone by distilling away the ketone at low pressures. The alcohols, free of carvone, can be separated by efficient fractionation.

Dihydrocarvone, carvone and the carveols are constituents of spearmint oils and our products are useful as spearmint flavors. It will be evident to those skilled in the art that carveol-rich fractions can be converted to carvone by chromic acid oxidation (Beckmann or equivalent) if desired to produce more carvone and less carveol than is produced on direct pyrolysis of the oxide.

The pseudocarveols are not of as much direct interest as spearmint flavors, but are readily converted to dihydrocarvone and carvone. Such conversion can be conducted as follows.

Either of the pseudocarveols or their mixtures may be agitated with 10% aqueous phosphoric acid at 80° C. for eight to fifteen hours to produce an oil mixture which when fractionated by distillation yields good quality dihydrocarvone.

To produce carvone the pseudocarveols may be subjected to Oppenauer oxidation at say 120° C. for 12 hours using acetone as oxidant and aluminum isopropylate as catalyst. Carvone is produced and can be recovered in optically active form if the starting epoxide was optically active.

Such treatments are applicable to the whole pyrolysate mixture or to fractions of the pyrolysate whereby any carveols and pseudocarveols are converted to carvone or to dihydrocarvone depending upon the treatment chosen.

In general pyrolysis at lower temperatures favors formation of alcohols and higher temperatures favor formation of dihydrocarvone. Choice of operating conditions therefore is determined to an extent by the ratio of products desired, usually the ratio of dihydrocarvone/carvone plus carvone precursors.

The lower boiling pseudocarveol obtained by pyrolysis of the low boiling oxide is believed to be trans with respect to hydroxyl and isopropenyl groups since hydrogenation with $PtO_2$ catalyst yields very largely carvomenthol (cis-OH,$CH_3$ vs. trans isopropyl, analogous to menthol configuration). On the other hand, the higher boiling pseudocarveol derived from the higher boiling oxide is believed to be cis with respect to —OH and -isopropenyl since hydrogenation yields neoisocarvomenthol (all substituents on the ring are cis-). The properties of the purified pseudocarveols are shown as follows:

|  | Low Boiling or Trans-Form | Higher Boiling or cis-Form |
|---|---|---|
| B.P. at 10 mm ° C | 99 | 107 |
| $D_4^{25}$ | 0.9411 | 0.9465 |
| $N_D^{25}$ | 1.4922 | 1.4963 |
| $\alpha_D^{25}$ (10 cm.) | +46.75 | +2.09 |

The optical rotations indicated refer to the pseudocarveols prepared from d-limonene and it will be understood that racemic and levo forms may be produced from dipentene and l-limonene respectively.

Both of the d-pseudocarveols prepared from d-limonene oxide are convertible by isomerization to d-dihydrocarvone and are converted by oxidation-rearrangement to l-carvone. Also, the carveols are levo-rotatory and are convertible to l-carvone by Oppenauer oxidation or by chromic acid oxidation (Beckmann). Although the two pseudocarveols behave similarly in many respects, they do differ with respect to yielding different products on hydrogenation as has been outlined above and also they differ somewhat in their behavior toward say Beckmann chromic acid oxidation. Thus the lower boiling pseudocarveol on oxidation by this means tends to give perillaldehyde and little dihydrocarvone whereas the higher boiling pseudocarveol gives much more dihydrocarvone and much less perillaldehyde. Since perillaldehyde is valuable for its organoleptic properties, as is well known, the lower boiling pseudocarveol is useful for its preparation.

The pseudocarveols possess a type of unsaturation rendering them more sensitive to polymerization by heat than are the corresponding carveols. While some polymerization is unavoidable due to the nature of the process for their preparation, it is advisable to avoid prolonged heating such as occurs on prolonged fractionation and to minimize the temperatures of distillation by employing pressures of 10 mm. or less during the distillation.

The following examples are illustrative of my invention:

EXAMPLE 1

A few ccs. of limonene oxide prepared by the air oxidation of citrus limonene was sealed in each of three glass capsules. The capsules were heated at 270° C. for 3, 6 and 12 hours respectively. At the end of the heating period, each capsule was opened and its contents examined by infrared spectrophotometry. The following results were obtained:

| Time | Percent $C_{10}$-Alcohol | Percent Unreacted Oxide |
|---|---|---|
| 3 Hours | 23 | 72 |
| 6 Hours | 40 | 42 |
| 12 Hours | 50 | 25 |

From the infrared spectrograms it was apparent that carveol and dihydrocarvone were present along with other compounds.

EXAMPLE 2

Three hundred and ninety-five grams of a fraction of limonene oxide prepared by the air oxidation of citrus limonene and very rich in the low boiling form of the oxide was heated in a stainless steel bomb at 270° C. for 12 hours. At the beginning of the heating period, the temperature overshot and reached as high as 287° C. for a short time. After cooling, the bomb was opened and the pyrolyzate was examined. The crude product showed 66% of terpene alcohol by infrared analysis.

The pyrolyzate was then distilled using a 1" x 48" protruded packed column and 29:1 reflux ratio. The distillation was conducted at a head pressure of 10 mm. Hg absolute. The results of the distillation and interpretations of the spectra of the fractions are shown in the Table I below:

Table 1

| Fraction | $B_{10}$ | Wt., Gms. | Cum. Wt. | Percent Distilled | $N_D^{25}$ | $[\alpha]$ 10 cm. | Percent Alcohol | Non-alcohol |
|---|---|---|---|---|---|---|---|---|
| 1 | 57-75 | 22 | 22 | 5.6 | 1.4683 | +60.6 | 0 | Much Limonene. Little Oxide. Little Carbonyl X. |
| 2 | 75-78 | 22 | 44 | 11.3 | 1.4629 | +24.7 | 17 | Much Oxide. Much Carbonyl X. |
| 3 | 78-88.5 | 26 | 70 | 18.0 | 1.4730 | +25.3 | 33 | Mostly Dihydro Carvone. |
| 4 | 88.5-94.5 | 24 | 94 | 24.2 | 1.4812 | +28.2 | 53 | Dihydro Carvone. Begin Carvone. |
| 5 | 94.5-101.5 | 22 | 116 | 30.0 | 1.4882 | +19.3 | 73 | End Dihydro Carvone. |
| 6 | 101.5-102 | 22 | 138 | 35.7 | 1.4902 | −2.5 | 83 | Carvone. |
| 7 | 102-102.5 | 26 | 164 | 42.5 | 1.4908 | −23.4 | 83 | Do. |
| 8 | 102.5-103 | 25 | 189 | 49.0 | 1.4920 | −61.4 | 83 | Do. |
| 9 | 103-105 | 23 | 212 | 54.9 | 1.4929 | −111.2 | 92 | Do. |
| 10 | 105-105.5 | 7 | 219 | 56.7 | 1.4932 | −138.2 | 100 | End of Carvone. |
| 11 | Residue | 137 | 356 |  |  |  | 50 | Polymer. |

The alcohols evident from the spectra were pseudocarveol and trans-carveol. The pseudocarveol was the lower boiling and toward the end of the distillation trans-carveol was obtained in fairly high purity. Little or no cis-carveol could be detected in the infrared spectrograms. Oxidation reduction reactions were evident by the presence of carvone and also limonene. The mechanism by which limonene oxide passed to limonene is open to speculation. The residue, which contained about 50% trans-carveol according to the infrared spectrogram was essentially devoid of other compounds exhibiting strong absorption bands in the infrared region.

A summation of the alcohol recovered in the fractions amounts to 198.3 grams or 50% of the charge. This is a poor check with the original 66% shown by the infrared analysis and suggests that some alcohol was destroyed during the distillation, possibly as polymer.

Of the two alcohols occurring in the distillate, trans-carveol was the major alcohol although considerable psi-carveol was also present.

The carbonyl compounds were dihydrocarvone, carvone and carbonyl X. The structure of carbonyl X is not known. It is lower boiling than dihydrocarvone and it seems likely from its infrared spectrogram carbonyl absorption that it is an aldehyde. Fraction 2 which contains a maximum of this compound is characterized by a minimum index of refraction and rotation.

The trans-carveol possessed considerable optical activity, but it is probably partly racemic owing to the ease with which carveol racemizes and the rather drastic conditions under which it was produced.

EXAMPLE 3

Citrous limonene was epoxidized using peracetic acid in the known manner. The crude oxide was fractionally distilled and selected fractions combined so that a mixture containing 44% low boiling and 56% high boiling forms as judged by infrared analysis was obtained. Two hundred eighty-six grams of this material was heated in a stainless steel bomb at 270°±5° C. for 12 hours but at this point only 23% of the oxide had been pyrolyzed. Heating was resumed for another 12 hours, this time at 300°±5° C., and at the end of this period about 12% oxide remained, all the high boiling form. Alcohol analysis was about 40%. The higher boiling oxide is quite evidently more stable thermally than the lower boiling form. The use of the higher temperature required to isomerize the higher boiling oxide caused loss of some alcohol to hydrocarbon and water and the formation of other secondary reaction products. The distillation was carried out using a 1″ by 60″ column packed with 3/16″ helices. A reflux ratio of 19:1 and a head pressure of 10 mm. Hg absolute was used for most of the distillation.

| Fraction | B | Wt., Gms. | Cum. Wt. | $N_D^{25}$ | $[\alpha]$ 10 cm. | Percent Alcohol | Non-alcohol |
|---|---|---|---|---|---|---|---|
| 1 | 100/100 | 5 |  | 1.4523 | +53.3 | 0 | 4 g. water. |
| 2 | 54-64/12 | 9 | 14 | 1.4695 | −83.7 | 0 | Limonene. |
| 3 | 65/12 | 9 | 23 | 1.4700 | +83.8 |  |  |
| 4 | 65-79/11 | 10 | 33 | 1.4682 | +65.9 | 7 | Limonene—much oxide. |
| 5 | 79-84/11 | 9 | 42 | 1.4680 | +57.7 | 2 | Much Oxide—Some carbonyl X. |
| 6 | 84-91/10 | 8.5 | 50.5 | 1.5680 | +43.3 | 9 | Much Oxide—Dihydro Carvone. |
| 7 | 93/10 | 11 | 61.5 | 1.4682 | +20.3 |  |  |
| 8 | 94/10 | 10 | 71.5 | 1.4603 | +14.7 | 20 | Mostly Dihydro Carvone. |
| 9 | 95/10 | 10 | 81.5 | 1.4730 | +11.8 |  |  |
| 10 | 97/10 | 9 | 90.5 | 1.4768 | +5.5 | 42 | Dihydro Carvone and Carvone. |
| 11 | 97/10 | 9 | 99.5 | 1.4815 | −4.0 |  |  |
| 12 | 97-100/10 | 7 | 106.5 | 1.4844 | −11.9 | 57 | Carvone. |
| 13 | 83-85/1 | 9.5 | 116.0 |  |  |  |  |
| 14 | 83/1 | 4.5 | 120.5 |  |  | 55 | Do. |
| 15 | Residue | 74 | 194 | Hard Tar |  |  |  |

The major products were trans-dihydrocarvone, carvone and an unidentified primary or secondary alcohol. The limonene produced, about 10% of the product, was fully active. Other hydrocarbons including cymene accompanied the limonene, but only in small quantity.

To examine the unidentified alcohol more closely, fraction 13 was treated with bisulfite to remove the bulk of the carvone. The residual alcohol, still containing a little carvone and dihydrocarveol, was examined by infrared analysis from which it could be ascertained that it could not contain much, if any, carveol, or dihydrocarveol. The alcohol was identified as the higher boiling form of pseudocarveol by hydrogenation to neoisocarvomenthol and oxidizing this to carvomenthone. There was very much less carbonyl X from the oxide rich in the higher boiling oxide than from the oxide rich in the lower boiling oxide.

It is apparent from the above data that prolonged reaction time necessary to achieve extensive reaction of the oxide is conducive to side reactions such as redox, polymerization and probably racemization.

EXAMPLE 4

Three hundred grams of d-limonene-1,2-monoxide (2% trans and 98% cis) was pyrolyzed by heating it in an autoclave for 34 hours at 260° to 265° C. The pyrolysate was recovered and fractionally distilled through an efficient column at 10 mm. pressure. Infrared spectroanalysis of the fractions indicated that the pyrolysate has the following composition:

25% unchanged d-limonene-1,2-monoxide
   5% to 7% d-hydrocarvone
   3% to 5% l-carvone
   2% to 4% l-cis-carveol
   11% to 13% d-cis-pseudocarveol
   16% to 18% unidentified alcohols
   30% polymeric material The reaction and structure of the products may be indicated as follows:

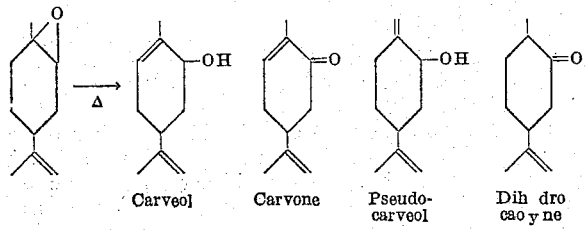

Carveol    Carvone    Pseudo-    Dihydro
                      carveol    caoyne

EXAMPLE 5

Limonene oxide, prepared by the air oxidation of citrus limonene, was pyrolyzed by dripping it down the side of a pyrolysis tube consisting of a ¼″ standard iron pipe about 30 inches long and heated from 450° to 460° C. The limonene oxide vaporized shortly after contacting the heated tube. The rate of flow was adjusted to 2 cc. per minute. Infrared analysis of the product showed 25% alcohol, considerable carbonyl and about 50% unchanged oxide. Pyrolysis under the same conditions but at 540° C. gave a product containing about 50% dihydrocarvone and 20% alcohols convertible to carvone and dihydrocarvone. Little or no oxide remained unreacted under these conditions.

Resort can be had to modifications and equivalents falling within the scope of my invention and the appended claims.

Having thus described my invention, I claim:

1. A process which comprises pyrolyzing limonene-1,2-oxide at temperatures of from about 200° C. and to about 550° C. and recovering therefrom fractions comprising carveol, carvone, and dihydrocarvone.

2. A continuous process according to claim 1 wherein at least a major amount of said limonene-1,2-oxide is pyrolyzed and wherein the unreacted oxide is recycled for further pyrolysis.

3. A method for preparing a mixture comprising carvone, carveol, dihydrocarvone and pseudocarveol which comprises pyrolyzing limonene-1,2-epoxide at temperatures of from about 200° C. to about 550° C. and fractionally distilling said mixture at reduced pressures.

References Cited in the file of this patent

Blumann et al.: Ber. Deut. Chem., vol. 47, pp. 2623–8 (1914).

Schmidt: Ber. Deut. Chem., vol. 82, pp. 11–16 (1949).

UNITED STATES PATENT OFFICE

CERTIFICATE OF CORRECTION

Patent No. 2,945,068

July 12, 1960

Albert B. Booth

It is hereby certified that error appears in the printed specification of the above numbered patent requiring correction and that the said Letters Patent should read as corrected below.

Column 7, lines 38 and 39, for "Dih dro caoyne" read -- Dihydro carvone --.

Signed and sealed this 13th day of December 1960.

(SEAL)
Attest:
KARL H. AXLINE
Attesting Officer

ROBERT C. WATSON
Commissioner of Patents